(12) United States Patent
Li

(10) Patent No.: US 12,417,728 B2
(45) Date of Patent: Sep. 16, 2025

(54) GOA CIRCUIT AND DISPLAY PANEL

(71) Applicant: WUHAN CHINA STAR OPTOELECTRONICS SEMICONDUCTOR DISPLAY TECHNOLOGY CO., LTD., Hubei (CN)

(72) Inventor: Bo Li, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/561,693

(22) PCT Filed: Jun. 29, 2023

(86) PCT No.: PCT/CN2023/103848
§ 371 (c)(1),
(2) Date: Nov. 16, 2023

(87) PCT Pub. No.: WO2024/109049
PCT Pub. Date: May 30, 2024

(65) Prior Publication Data
US 2025/0087131 A1  Mar. 13, 2025

(30) Foreign Application Priority Data
Nov. 22, 2022 (CN) .......................... 202211468180.7

(51) Int. Cl.
*G09G 3/20* (2006.01)

(52) U.S. Cl.
CPC ... *G09G 3/2092* (2013.01); *G09G 2310/0267* (2013.01); *G09G 2310/08* (2013.01)

(58) Field of Classification Search
CPC ......... G09G 3/2092; G09G 2310/0267; G09G 2310/08; G09G 3/20; G09G 3/3266;
(Continued)

(56) References Cited

U.S. PATENT DOCUMENTS 11,270,629 B2 * 3/2022 Yu .......................... G09G 3/3266
12,230,216 B2 * 2/2025 Lu .......................... G09G 3/3233
(Continued)

FOREIGN PATENT DOCUMENTS

| CN | 103558703 A | 2/2014 |
| CN | 106601190 A | 4/2017 |

(Continued)

OTHER PUBLICATIONS

International Search Report in International application No. PCT/CN2023/103848, mailed on Nov. 20, 2023.
(Continued)

*Primary Examiner* — Jose R Soto Lopez
(74) *Attorney, Agent, or Firm* — PV IP PC; Wei Te Chung

(57) ABSTRACT

An embodiment of the present disclosure provides a GOA circuit and a display panel. The GOA circuit includes a plurality of cascaded GOA units with multi-stages. Besides a first stage GOA unit, each GOA unit includes a first output control circuit, a second output control circuit, a first output circuit, and a second output circuit. The first output circuit is used to output a first scanning signal. The second output circuit is used to output the second scanning signal. This GOA circuit reduces bezel space occupied by the GOA.

17 Claims, 4 Drawing Sheets

(58) Field of Classification Search
CPC .................. G09G 3/36; G09G 3/3677; G09G 2300/0426; G09G 2310/02; G09G 2330/021; G02F 1/1333; G02F 1/1345; G02F 1/1362
See application file for complete search history.

(56) References Cited

U.S. PATENT DOCUMENTS

| | | | | |
|---|---|---|---|---|
| 2011/0057190 | A1* | 3/2011 | Kimura | H10D 86/441 |
| | | | | 257/E27.06 |
| 2013/0136224 | A1* | 5/2013 | Qing | G11C 19/28 |
| | | | | 377/64 |
| 2013/0321499 | A1* | 12/2013 | Park | G09G 3/3275 |
| | | | | 345/698 |
| 2014/0267214 | A1* | 9/2014 | Hwang | G09G 3/3648 |
| | | | | 345/212 |
| 2015/0161958 | A1 | 6/2015 | Hsu et al. | |
| 2016/0293094 | A1* | 10/2016 | Park | G09G 3/20 |
| 2017/0256203 | A1* | 9/2017 | Han | G11C 19/287 |
| 2018/0144711 | A1* | 5/2018 | Noh | G09G 3/3677 |
| 2018/0182345 | A1* | 6/2018 | Seong | G09G 3/3688 |
| 2018/0218685 | A1* | 8/2018 | Li | G09G 3/3266 |
| 2019/0035322 | A1* | 1/2019 | Kim | H10D 86/60 |
| 2019/0073948 | A1* | 3/2019 | Wang | G09G 3/3225 |
| 2019/0228830 | A1* | 7/2019 | Xu | G11C 19/287 |
| 2019/0311691 | A1* | 10/2019 | Feng | G09G 3/36 |
| 2020/0133327 | A1* | 4/2020 | Lee | G06F 1/08 |
| 2020/0342808 | A1* | 10/2020 | Han | G09G 3/3266 |
| 2021/0118375 | A1* | 4/2021 | Yang | G09G 3/3266 |
| 2021/0225251 | A1* | 7/2021 | Xu | G09G 3/2092 |
| 2022/0020332 | A1* | 1/2022 | Yang | G09G 3/3266 |
| 2022/0284842 | A1* | 9/2022 | Chen | G09G 3/20 |
| 2024/0090264 | A1* | 3/2024 | Kim | H10D 30/6723 |

FOREIGN PATENT DOCUMENTS

| | | |
|---|---|---|
| CN | 107403612 A | 11/2017 |
| CN | 109410886 A | 3/2019 |
| CN | 110930942 A | 3/2020 |
| CN | 11276084 A | 6/2020 |
| CN | 113012743 A | 6/2021 |
| CN | 115019718 A | 9/2022 |
| CN | 115938324 A | 4/2023 |
| EP | 3678124 A1 | 7/2020 |
| KR | 20170035973 A | 3/2017 |
| WO | 2022160888 A | 8/2022 |
| WO | 2022160889 A | 8/2022 |

OTHER PUBLICATIONS

Written Opinion of the International Search Authority in International application No. PCT/CN2023/103848, mailed on Nov. 20, 2023.
Korean Office Action issued in corresponding Korean Patent Application No. 10-2023-7039625 dated Aug. 31, 2024, pp. 1-5.
Japanese Office Action issued in corresponding Japanese Patent Application No. 2023-574143 dated Dec. 17, 2024, pp. 1-4.
Chinese Office Action issued in corresponding Chinese Patent Application No. 202211468180.7 dated Jun. 7, 2025, pp. 1-5.
Japanese Office Action issued in corresponding Japanese Patent Application No. 特願 2023-574143 dated Jun. 17, 2025, pp. 1-5.

\* cited by examiner

GOA CIRCUIT AND DISPLAY PANEL

FIELD OF INVENTION

The present disclosure relates to a field of display technology, more specifically relates to a Gate Driver On Array (GOA) circuit and a display panel.

BACKGROUND

A Gate Driver On Array (GOA) is a driving structure that uses the existing thin-film transistor liquid crystal display array process to form GOA circuit on an array substrate to realize driving row by row.

The existing GOA circuit adopts low-temperature polycrystalline oxide display technology, which combines advantages of low-temperature polysilicon thin-film transistors and oxide thin-film transistors, so that the display panel can have the characteristics of strong driving ability and low power consumption at the same time. However, a GOA circuit applied for the low-temperature polycrystalline oxide display technology has many cascaded GOA units to output forward and reverse scanning signals. The cascaded GOA units are required a wide bezel of the display panel to dispose.

With people's visual demand for a narrow bezel of the display panel, how to reduce the bezel space occupied by the GOA circuit and to make the display panel achieve narrower borders or borderless design is a problem to be solved.

SUMMARY

An object of embodiments of the present disclosure is to provide a GOA circuit and a display panel to reduce the bezel space occupied by the GOA circuit.

According to a aspect of embodiment of the present disclosure, a Gate on array (GOA) circuit includes a plurality of cascaded GOA units with multi-stages. Each GOA unit includes a first output control circuit, a second output control circuit, a first output circuit, and a second output circuit. The first output control circuit, coupled to a scanning signal input terminal of a previous stage GOA unit and a first node, is used for controlling a potential of the first node. The second output control circuit, coupled to the scanning signal input terminal of the previous stage GOA unit and a second node, is used for controlling a potential of the second node. The first output circuit, coupled to the first node, the second node, and a first scanning signal output terminal of a current stage GOA unit, is used for outputting the first scanning signal. The second output circuit, coupled to the first node and a second scanning signal output terminal of the current stage GOA unit, is used for outputting a second scanning signal. The first scanning signal and the second scanning signal are inverted.

According to another aspect of embodiments of the present disclosure, a display panel includes a display area and a GOA circuit integrated on an edge of the display area. The GOA circuit includes a plurality of cascaded GOA units with multi-stages. Each GOA unit includes a first output control circuit, a second output control circuit, a first output circuit, and a second output circuit. The first output control circuit, coupled to a scanning signal input terminal of a previous stage GOA unit and a first node, is used for controlling a potential of the first node. The second output control circuit, coupled to the scanning signal input terminal of the previous stage GOA unit and a second node, is used for controlling a potential of the second node. The first output circuit, coupled to the first node, the second node, and a first scanning signal output terminal of a current stage GOA unit, is used for outputting the first scanning signal. The second output circuit, coupled to the first node and a second scanning signal output terminal of the current stage GOA unit, is used for outputting a second scanning signal. The first scanning signal and the second scanning signal are inverted.

Advantageous Effect

According to the GOA circuit and display panel provided in the embodiments of the present disclosure, besides a first stage GOA unit, the GOA unit comprises a first output control circuit, a second output control circuit, a first output circuit, and a second output circuit. The first output circuit is used to output the first scanning signal, and the second output circuit is used to output the second scanning signal. The GOA circuit includes the first output circuit and the second output circuit to output forward and reverse scanning signals, so that the bezel space occupied by the GOA is reduced and is conducive to achieving a narrower bezel or borderless design.

DETAILED DESCRIPTION OF PREFERRED EMBODIMENTS

The following will be combined with the accompanying drawings in the embodiment of the present disclosure, the technical solution in the embodiment of the present disclosure will be described. The embodiments described are intended only to explain and illustrate the ideas of the present disclosure and should not be regarded as a limitation of the scope of protection of the present disclosure.

The transistors used in all embodiments of the present disclosure may be thin-film transistors or Field Effect Transistors (FETs) or other devices with the same characteristics. Because the source and drain of the transistor used herein are symmetrical, so the source and drain are interchangeable. In an embodiment of the present disclosure, in order to distinguish the two electrodes of the transistor other than the gate, one of the source and drain is referred to as the first electrode, and the other of the source and drain are referred to as the second electrode. According to the pattern in the accompanying figure, the middle input of the switching transistor is the gate, the input terminal is the first electrode, and the output terminal is the second electrode. Further, the transistor used in the embodiments of the present disclosure is a P-type transistor or an N-type transistor, where the P-type transistor is turned on in response to a low potential applied on the gate, and is cut off in response to a high potential applied on the gate. An N-type transistor is turned on in response to a high potential applied on the gate, and cut-off in response to a low potential applied on the gate.

Figure 1:
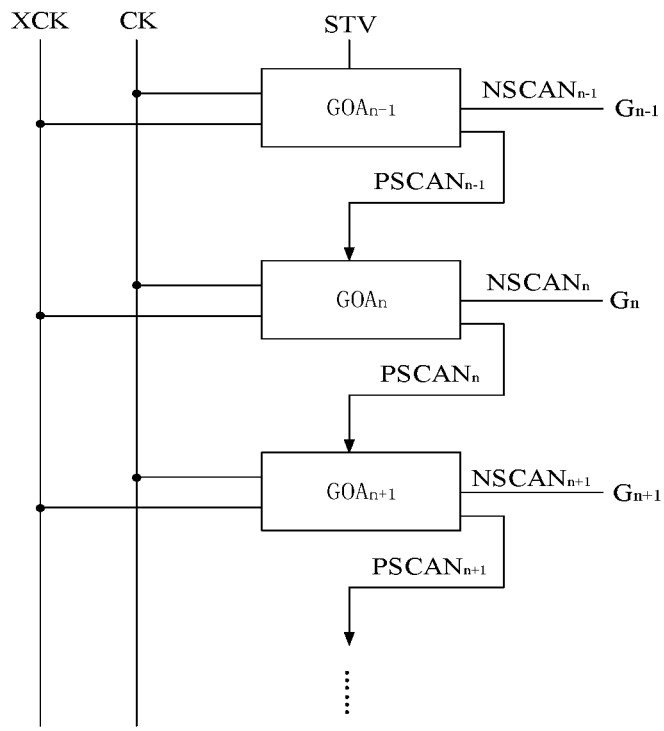
FIG. 1 is a schematic diagram of a GOA circuit according to an embodiment of the present disclosure.

Referring to FIG. 1, FIG. 1 is a schematic diagram of a GOA circuit according to an embodiment of the present disclosure. As shown in FIG. 1, the GOA circuit provided by an embodiment of the present disclosure comprises a plurality of cascaded GOA units with multi-stages. FIG. 1 takes the (N−1)th stage GOA unit GOA(n−1), the Nth stage GOA unit GOA(n), and the (N+1)th stage GOA unit GOA(n+1) as examples.

The (N−1)th stage GOA unit GOA (n−1), the Nth GOA unit GOA(n), and the (N+1)th GOA unit GOA (n+1) are connected to the scan lines G(n−1), G(n), and G(n+1), respectively. The Nth stage GOA unit GOA(n) is fed with the first scanning signal PSCAN (n−1) output by the (N−1)th stage GOA unit GOA (n−1). The (N+1)th stage GOA unit GOA (n+1) is fed with the first scanning signal PSCAN(n) output by the Nth stage GOA unit GOA (n), and so on. At the same time, the (N−1)th stage GOA unit GOA(n−1) transmits the second scanning signal NSCAN (n−1) to the scan line G(n−1) connected to the (N−1)th stage GOA unit GOA(n), the Nth stage GOA unit GOA(n) transmits the second scanning signal NSCAN(n) to the scan line G(n) connected to the Nth stage GOA unit GOA(n), and the (N+1)th GOA unit GOA (n+1) transmits the second scanning signal NSCAN (n+1) is transmitted to the scan line G(n+1) connected to the (N+1)th GOA unit GOA (n+1), and so on.

It is noted that, in an embodiment of the present disclosure, the first scanning signal may also be NSCAN(n), the first scanning signal NSCAN(n) output to the next stage GOA unit. The second scanning signal is PSCAN(n), and the second scanning signal PSCAN(n) is transmitted to the scan line G(n) connected to the Nth GOA unit GOA(n).

The first stage GOA unit GOA (1) transmits the second scanning signal NSCAN (1) to the first scan line G (1) connected to the first stage GOA unit GOA (1) in response to the start signal STV. The first scanning signal PSCAN (1) is transmitted to the second stage GOA unit GOA (2). It should be noted that the Nth stage GOA unit (N is a natural number greater than 1) can transmit the second scanning signal NSCAN(n) to the Nth scan line G(n). The first scanning signal PSCAN(n) is transmitted to the (N+1)th GOA unit GOA(n+1).

The scan-driven control signal includes the first clock signal CK and the second clock signal XCK. The first clock signal CK and the second clock signal XCK can be inverted clock signals. That is, when the first clock signal CK is at high potential, and the second clock signal XCK is at low potential. When the first clock signal CK is at low potential, and the second clock signal XCK is at high potential.

When the Nth stage GOA unit is operating, the second scanning signal NSCAN(n) output by the Nth stage GOA unit GOA(n) is at high potential, which is used to turn on a switch transistor for each pixel in a row in the display panel and charge the pixel electrodes in each pixel through the data signal. The first scanning signal PSCAN(n) is used to control the operation of the (N+1)th GOA unit. When the (N+1)th GOA unit is operating, the second scanning signal NSCAN (n+1) output by the (N+1)th GOA unit GOA (n+1) is at high potential, and the second scanning signal NSCAN(n) output by the Nth stage GOA unit GOA (n) is at low potential.

Figure 2:
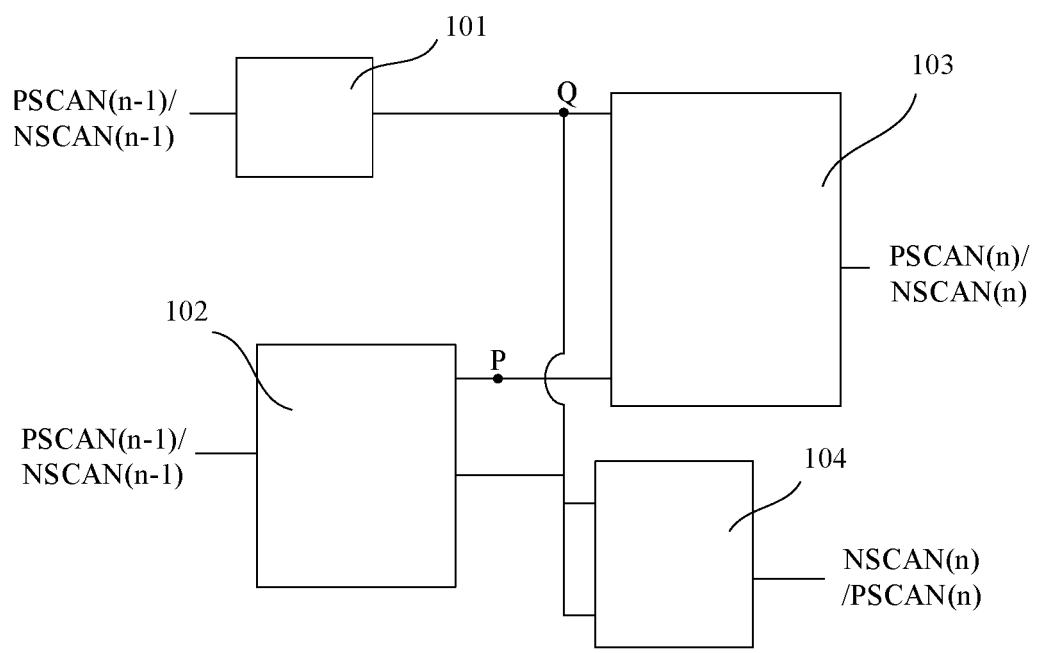
FIG. 2 is a block diagram of a GOA unit in a GOA circuit according to an embodiment of the present disclosure.

Referring to FIG. 2, FIG. 2 is a block diagram of a GOA unit in a GOA circuit according to an embodiment of the present disclosure. It is noted that the GOA unit illustrated in FIG. 2 is not a first stage GOA unit. The GOA unit includes a first output control circuit 101, a second output control circuit 102, a first output circuit 103 and a second output circuit 104.

Specifically, the first output control circuit 101 is coupled to the scanning signal input terminal PSCAN (n−1)/NSCAN (n−1) of the previous stage GOA unit and the first node Q. The first output control circuit 101 is used to control the potential of the first node Q.

Specifically, the second output control circuit 102 is coupled to the scanning signal input terminal PSCAN (n−1)/NSCAN (n−1) of the previous stage GOA unit and the second node P. The second output control circuit 102 is used to control the potential of the second node P.

Specifically, the first output circuit 103 is coupled to the first node Q, the second node P and the first scanning signal output terminal PSCAN(n)/NSCAN(n) of the current stage GOA unit. The first output circuit 103 is used to output the first scanning signal PSCAN (n−1)/NSCAN (n−1).

Specifically, the second output circuit 104 is coupled to the first node Q and the second scanning signal output terminal NSCAN(n)/PSCAN(n) of the current stage GOA unit. The second output circuit 104 is used to output the second scanning signal NSCAN (n)/PSCAN (n).

The first scanning signal PSCAN(n)/NSCAN(n) is in opposite phase to the second scanning signal NSCAN(n)/PSCAN(n). That is, when the first scanning signal is PSCAN (n), the second scanning signal is NSCAN(n). Alternatively, if the first scanning signal is NSCAN(n), the second scanning signal is PSCAN(n).

The GOA circuit includes a first output circuit 103 and a second output circuit 104. Because the first output circuit 103 and the second output circuit 104 output scanning signals of opposite phases, the forward and reverse scanning signal can be output by one stage GOA unit, reducing the bezel space occupied by GOA, which is conducive to achieving a narrower bezel or no bezel design.

In an embodiment of the present disclosure, the second output circuit 104 includes a first transistor T1 and a second transistor T2. The gate of the first transistor T1 is coupled to the first node Q, the first electrode of the first transistor T1 is coupled to the high-voltage reference signal input terminal VGH, and the second electrode of the first transistor T1 is coupled to the second scanning signal output terminal NSCAN(n). The gate of the second transistor T2 is coupled to the first output circuit 103, the first electrode of the second transistor T2 is coupled to the low-voltage reference signal input terminal VGL, and the second electrode of the second transistor T2 is coupled to the second electrode of the first transistor T1.

Figure 3:
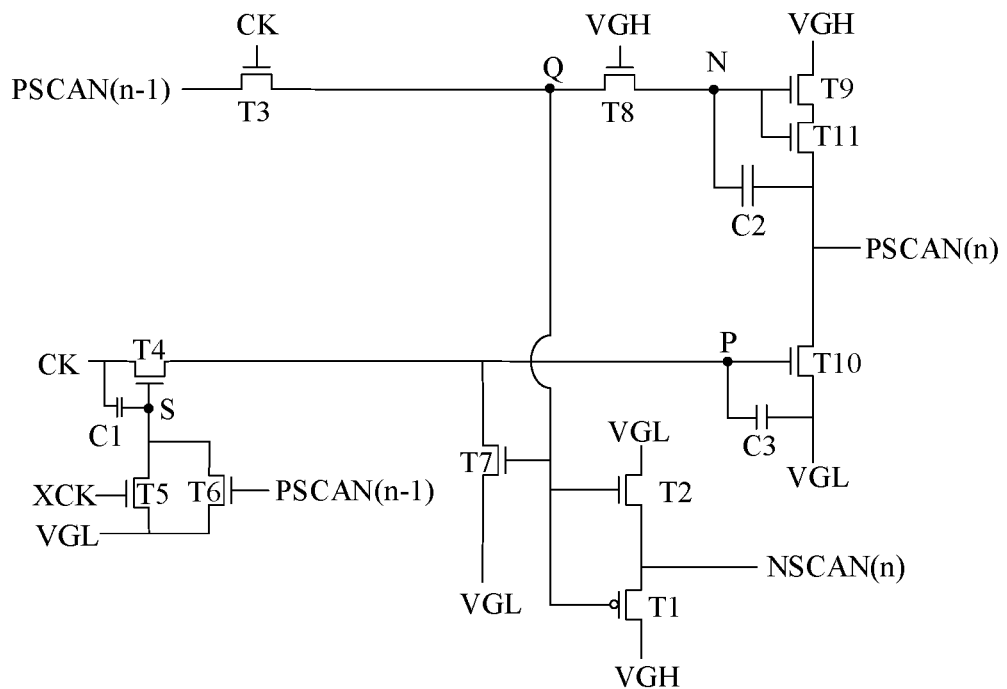
FIG. 3 is a circuit diagram of a GOA unit according to a first embodiment of the present disclosure.

Referring to FIG. 3, FIG. 3 is a circuit diagram of a GOA unit according to a first embodiment of the present disclosure. The second output circuit 104 includes a first transistor T1 and a second transistor T2. The gate of the first transistor T1 is coupled to the first node Q, the first electrode of the first transistor T1 is coupled to the high-voltage reference signal input terminal VGH, and the second electrode of the first transistor T1 is coupled to the second scanning signal output terminal NSCAN(n).

The gate of the second transistor T2 is coupled to the first node Q, the first electrode of the second transistor T2 is coupled to the low-voltage reference signal input terminal VGL, and the second electrode of the second transistor T2 is coupled to the second electrode of the first transistor T1.

Specifically, the first output control circuit 101 includes a third transistor T3. The gate of the third transistor T3 is coupled to the first clock signal terminal CK, the first electrode of the third transistor T3 is coupled to the scanning signal input terminal PSCAN (n−1) of the previous stage GOA unit, and the second electrode of the third transistor T3 is coupled to the first node Q.

Specifically, the second output control circuit 102 includes a fourth transistor T4, a fifth transistor T5, a sixth transistor T6, a seventh transistor T7 and a first capacitor C1. The gate of the fourth transistor T4 is coupled to the third node S, the first electrode of the fourth transistor T4 is coupled to the first clock signal terminal CK, and the second electrode of the fourth transistor T4 is coupled to the second node P.

The gate of the fifth transistor T5 is coupled to the second clock signal terminal XCK, the first electrode of the fifth transistor T5 is coupled to the third node S, and the second electrode of the fifth transistor T5 is coupled to the low-voltage reference signal input terminal VGL.

The gate of the sixth transistor T6 is coupled to the scanning signal input terminal PSCAN (n−1) of the previous stage GOA unit, the first electrode of the sixth transistor T6 is coupled to the low-voltage reference signal input terminal VGL, and the second electrode of the sixth transistor T6 is coupled to the third node S.

The gate of the seventh transistor T7 is coupled to the first node Q, the first electrode of the seventh transistor T7 is coupled to the low-voltage reference signal input terminal VGL, and the second electrode of the seventh transistor T7 is coupled to the second node P.

One end of the first capacitor C1 is coupled to the first clock signal terminal CK, and the other end of the first capacitor C1 is coupled to the third node S.

Specifically, the first output circuit 103 includes an eighth transistor T8, a ninth transistor T9, a tenth transistor T10, a second capacitor C2, and a third capacitor C3. The gate of the eighth transistor T8 is coupled to the high-voltage reference signal input terminal VGH, the first electrode of the eighth transistor T8 is coupled to the first node Q, and the second electrode of the eighth transistor T8 is coupled to the fourth node N.

The gate of the ninth transistor T9 is coupled to the fourth node N, the first electrode of the ninth transistor T9 is coupled to the high-voltage reference signal input terminal VGH, and the second electrode of the ninth transistor T9 is coupled to the first scanning signal output terminal PSCAN (n). The first scanning signal output terminal PSCAN(n) is coupled to the scanning signal input terminal of the next stage GOA unit.

The gate of the tenth transistor T10 is coupled to the second node P, the first electrode of the tenth transistor T10 is coupled to the low-voltage reference signal input terminal VGL, and the second electrode of the tenth transistor T10 is coupled to the first scanning signal output terminal PSCAN (n).

One end of the second capacitor C2 is coupled to the fourth node N, and the other end of the second capacitor C2 is coupled to the first scanning signal output terminal PSCAN(n). One end of the third capacitor C3 is coupled to the second node P, and the other end of the third capacitor C3 is coupled to the low-voltage reference signal input terminal VGL.

Specifically, the first output circuit 103 further comprises an eleventh transistor T11. The gate of the eleventh transistor T11 is coupled to the fourth node N, the first electrode of the eleventh transistor T11 is coupled to the second electrode of the ninth transistor T9, and the second electrode of the eleventh transistor T11 is coupled to the first scanning signal output terminal PSCAN(n).

The second transistor T2, the third transistor T3, the fourth transistor T4, the fifth transistor T5, the sixth transistor T6, the seventh transistor T7, the eighth transistor T8, the ninth transistor T9, the tenth transistor T10, and the eleventh transistor T11 are all N-type transistors. The first transistor T1 is a P-type transistor.

It is noted that the scanning signal input terminal PSCAN (n−1) of the previous stage GOA unit is fed with the scanning signal of the previous stage GOA unit. The first scanning signal output terminal PSCAN(n) outputs the first scanning signal PSCAN(n). The second scanning signal output terminal NSCAN(n) outputs the second scanning signal NSCAN(n). The first clock signal terminal CK outputs the first clock signal, and the second clock signal terminal XCK outputs to the second clock signal. The high-voltage reference signal input terminal VGH outputs the reference high signal, and the low-voltage reference signal input terminal VGL outputs the reference low signal.

Figure 4:
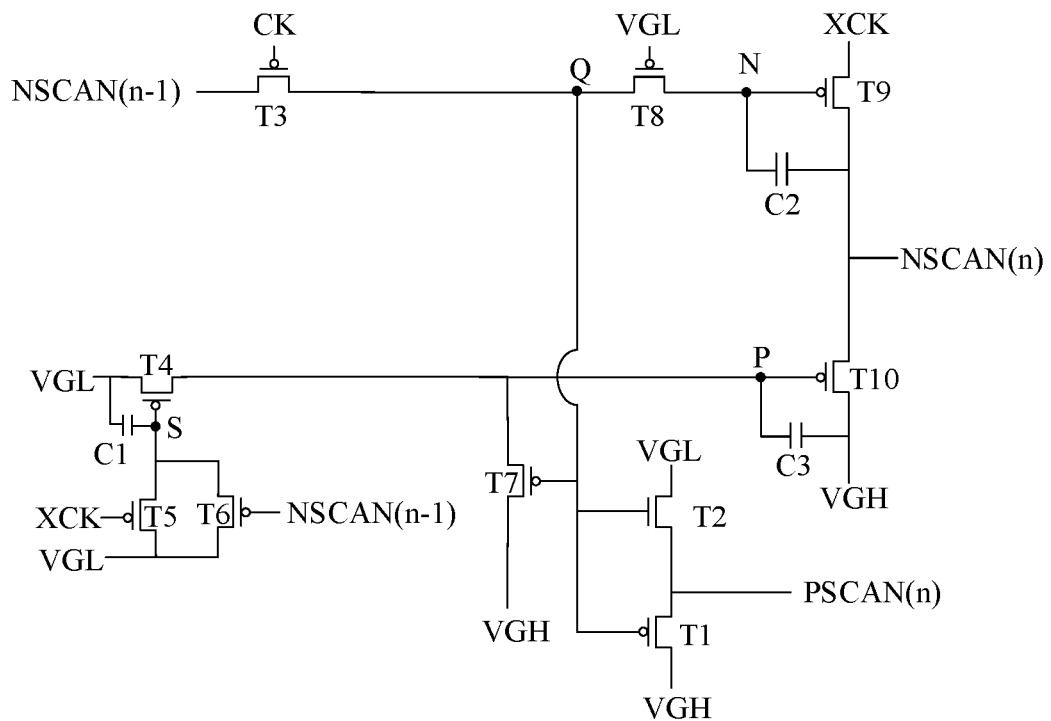
FIG. 4 is a circuit diagram of a GOA unit according to a second embodiment of the present disclosure.

Specifically, referring to FIG. 4, FIG. 4 is a circuit diagram of a GOA unit according to a second embodiment of the present disclosure. The second output circuit 104 includes a first transistor T1 and a second transistor T2. The gate of the first transistor T1 is coupled to the first node Q, the first electrode of the first transistor T1 is coupled to the high-voltage reference signal input terminal VGH, and the second electrode of the first transistor T1 is coupled to the second scanning signal output terminal PSCAN(n). The gate of the second transistor T2 is coupled to the second node P, the first electrode of the second transistor T2 is coupled to the low-voltage reference signal input terminal VGL, and the second electrode of the second transistor T2 is coupled to the second electrode of the first transistor T1.

Specifically, the first output control circuit 101 includes a third transistor T3. The gate of the third transistor T3 is coupled to the first clock signal terminal CK, the first electrode of the third transistor T3 is coupled to the scanning signal input NSCAN (n−1) of the previous stage GOA unit, and the second electrode of the third transistor T3 is coupled to the first node Q.

Specifically, the second output control circuit 102 includes a fourth transistor T4, a fifth transistor T5, a sixth transistor T6, a seventh transistor T7, and a first capacitor C1. The gate of the fourth transistor T4 is coupled to the third node S, the first electrode of the fourth transistor T4 is coupled to the first clock signal terminal CK, and the second electrode of the fourth transistor T4 is coupled to the second node P.

The gate of the fifth transistor T5 is coupled to the second clock signal terminal XCK, the first electrode of the fifth transistor T5 is coupled to the third node S, and the second electrode of the fifth transistor T5 is coupled to the low-voltage reference signal input terminal VGL.

The gate of the sixth transistor T6 is coupled to the scanning signal input NSCAN (n−1) of the previous stage GOA unit, the first electrode of the sixth transistor T6 is coupled to the low-voltage reference signal input terminal VGL, and the second electrode of the sixth transistor T6 is coupled to the third node S.

The gate of the seventh transistor T7 is coupled to the first node Q, the first electrode of the seventh transistor T7 is coupled to the low-voltage reference signal input terminal VGL, and the second electrode of the seventh transistor T7 is coupled to the second node P.

One end of the first capacitor C1 is coupled to the first clock signal terminal CK, and the other end of the first capacitor C1 is coupled to the third node S.

Specifically, the first output circuit 103 includes an eighth transistor T8, a ninth transistor T9, a tenth transistor T10, a second capacitor C2, and a third capacitor C3. The gate of the eighth transistor T8 is coupled to the high-voltage reference signal input terminal VGH, the first electrode of the eighth transistor T8 is coupled to the first node Q, and the second electrode of the eighth transistor T8 is coupled to the fourth node N.

The gate of the ninth transistor T9 is coupled to the fourth node N, the first electrode of the ninth transistor T9 is coupled to the high-voltage reference signal input terminal VGH, and the second electrode of the ninth transistor T9 is coupled to the first scanning signal output terminal NSCAN(n). The first scanning signal output terminal NSCAN(n) is coupled to the scanning signal input terminal of the next stage GOA unit.

The gate of the tenth transistor T10 is coupled to the second node P, the first electrode of the tenth transistor T10 is coupled to the low-voltage reference signal input terminal VGL, and the second electrode of the tenth transistor T10 is coupled to the first scanning signal output NSCAN(n).

One end of the second capacitor C2 is coupled to the fourth node N, and the other end of the second capacitor C2 is coupled to first scanning signal output terminal NSCAN (n). One end of the third capacitor C3 is coupled to the second node P, and the other end of the third capacitor C3 is coupled to the low-voltage reference signal input terminal VGL.

The third transistor T3, the fifth transistor T5, the sixth transistor T6, the eighth transistor T8, the ninth transistor T9 and the tenth transistor T10 are N-type transistors. The first transistor T1, second transistor T2 and seventh transistor T7 are P-type transistors.

It is noted that the scanning signal input terminal NSCAN (n–1) of the previous stage GOA unit outputs the scanning signal of the previous stage GOA unit, the first scanning signal output terminal NSCAN(n) outputs the first scanning signal, and the second scanning signal output terminal PSCAN(n) outputs the second scanning signal. The first clock signal terminal CK outputs the first clock signal CK, and the second clock signal terminal XCK outputs the second clock signal XCK. The high-voltage reference signal input terminal VGH outputs the reference high level signal, and the low-voltage reference signal input terminal VGL outputs the reference low level signal.

Figure 5:
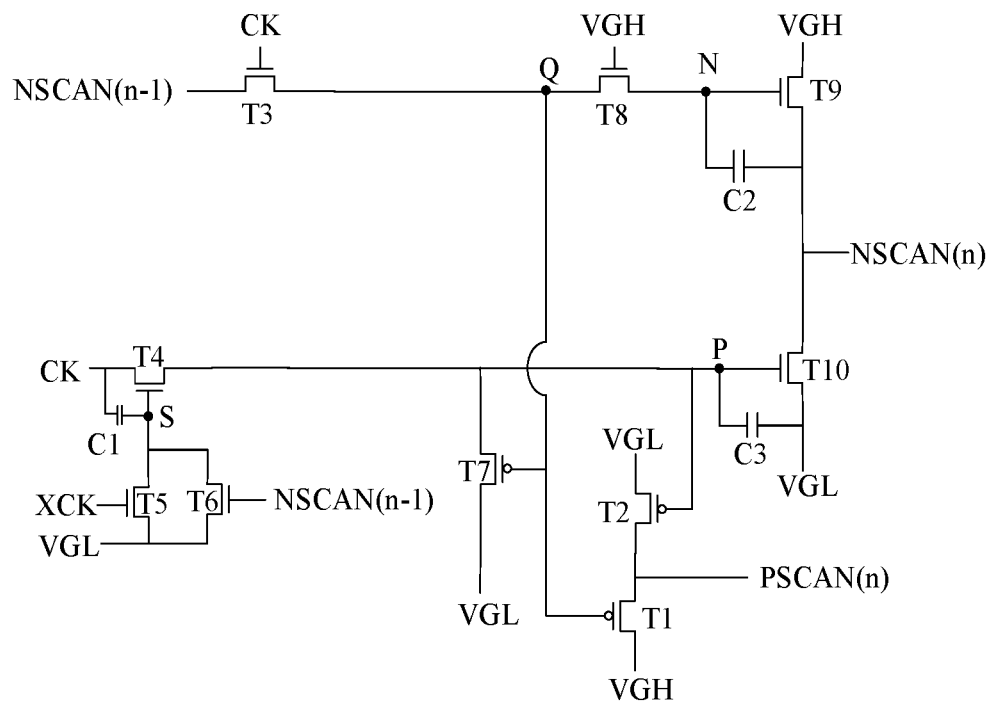
FIG. 5 is a circuit diagram of a GOA unit according to a third embodiment of the present disclosure.

Specifically, referring to FIG. 5, FIG. 5 is a circuit diagram of a GOA unit according to a third embodiment of the present disclosure. The second output circuit 104 includes a first transistor T1 and a second transistor T2. The gate of the first transistor T1 is coupled to the first node Q, the first electrode of the first transistor T1 is coupled to the high-voltage reference signal input terminal VGH, and the second electrode of the first transistor T1 is coupled to the second scanning signal output terminal PSCAN(n).

Specifically, the gate of the second transistor T2 is coupled to the first node Q, the first electrode of the second transistor T2 is coupled to the low-voltage reference signal input terminal VGL, and the second electrode of the second transistor T2 is coupled to the second electrode of the first transistor T1.

Specifically, the first output control circuit 101 includes a third transistor T3. The gate of the third transistor T3 is coupled to the first clock signal terminal CK, the first electrode of the third transistor T3 is coupled to the scanning signal input NSCAN (n–1) of the previous stage GOA unit, and the second electrode of the third transistor T3 is coupled to the first node Q.

Specifically, the second output control circuit 102 includes a fourth transistor T4, a fifth transistor T5, a sixth transistor T6, a seventh transistor T7, and a first capacitor C1. The gate of the fourth transistor T4 is coupled to the third node S, the first electrode of the fourth transistor T4 is coupled to the low-voltage reference signal input terminal VGL, and the second electrode of the fourth transistor T4 is coupled to the second node P.

The gate of the fifth transistor T5 is coupled to the second clock signal terminal XCK, the first electrode of the fifth transistor T5 is coupled to the third node S, and the second electrode of the fifth transistor T5 is coupled to the low-voltage reference signal input terminal VGL.

The gate of the sixth transistor T6 is coupled to the scanning signal input NSCAN (n–1) of the previous stage GOA unit, the first electrode of the sixth transistor T6 is coupled to the low-voltage reference signal input terminal VGL, and the second electrode of the sixth transistor T6 is coupled to the third node S.

The gate of the seventh transistor T7 is coupled to the first node Q, the first electrode of the seventh transistor T7 is coupled to the high-voltage reference signal input terminal VGH, and the second electrode of the seventh transistor T7 is coupled to the second node P.

One end of the first capacitor C1 is coupled to the low-voltage reference signal input terminal VGL, and the other end of the first capacitor C1 is coupled to the third node S.

Specifically, the first output circuit 103 includes an eighth transistor T8, a ninth transistor T9, a tenth transistor T10, a second capacitor C2, and a third capacitor C3. The gate of the eighth transistor T8 is coupled to the low-voltage reference signal input terminal VGL, the first electrode of the eighth transistor T8 is coupled to the first node Q, and the second electrode of the eighth transistor T8 is coupled to the fourth node N.

The gate of the ninth transistor T9 is coupled to the fourth node N, the first electrode of the ninth transistor T9 is coupled to the second clock signal terminal XCK, and the second electrode of the ninth transistor T9 is coupled to the first scanning signal output NSCAN(n).

The gate of the tenth transistor T10 is coupled to the second node P, the first electrode of the tenth transistor T10 is coupled to the high-voltage reference signal input terminal VGH, and the second electrode of the tenth transistor T10 is coupled to the first scanning signal output NSCAN(n).

One end of the second capacitor C2 is coupled to the fourth node N, and the other end of the second capacitor C2 is coupled to the first scanning signal output NSCAN(n).

One end of the third capacitor C3 is coupled to the second node P, and the other end of the third capacitor C3 is coupled to the high-voltage reference signal input terminal VGH.

The first transistor T1, the third transistor T3, the fifth transistor T5, the sixth transistor T6, the seventh transistor T7, the eighth transistor T8, the ninth transistor T9, and the tenth transistor T10 are all P-type transistors. The second transistor T2 is an N-type transistor.

It is noted that the scanning signal input terminal NSCAN (n–1) of the previous stage GOA unit outputs the scanning signal of the previous stage GOA unit. The first scanning signal output terminal NSCAN(n) outputs the first scanning signal. The second scanning signal output terminal PSCAN (n) outputs the second scanning signal. The first clock signal terminal CK outputs the first clock signal, and the second clock signal terminal XCK outputs the second clock signal. The high-voltage reference signal input terminal VGH outputs the high-voltage reference signal, and the low-voltage reference signal input terminal VGL outputs the low-voltage reference signal.

Figure 6:
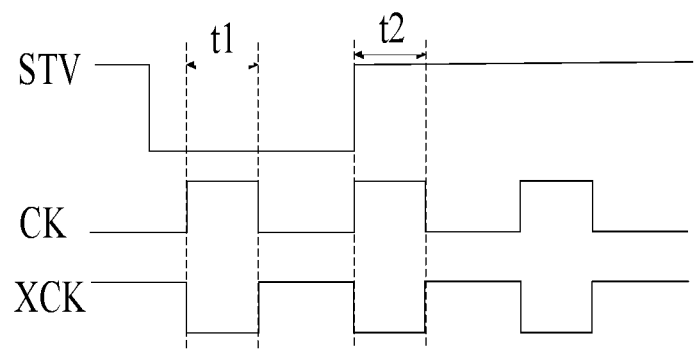
FIG. 6 illustrates a timing diagram of signals applied on the GOA unit illustrated in FIG. 3.

Referring to FIG. 6 illustrating a timing diagram of signals applied on a GOA unit in the GOA circuit shown in FIG. 3, a set of clock control signals applied on the GOA circuit in one frame period are high-frequency signals with a duty cycle of 50%. The clock signals with different duty cycles can be set according to the actual display panel to drive the GOA circuit, or multiple groups of high-frequency clock signals can be designed according to the load of the display panel. Specifically, the start signal STV input to the first output control circuit 101 of the first stage GOA unit and the first output circuit 103 of the last stage GOA unit is used for charging the first node Q.

Specifically, the start signal STV of the GOA circuit triggers the first stage GOA circuit, and the start signal STV of the (N+1)th GOA circuit is generated by the first stage scanning signal PSCAN(n) output by the first output circuit 103 of the Nth stage GOA unit, so that the GOA units of the GOA circuit can be turned on stage by stage to realize the row-by-row scanning.

Specifically, the first clock signal from the first clock signal terminal CK and the second clock signal XCK from the second clock signal terminal are a set of high-frequency clock signals with the same high and low potentials and opposite phases. A pulse width, a period and high and low potentials of the clock signal mainly depend on the design needs of the scanning signal waveform of the display panel, so in the actual display panel application, the signal with a duty cycle of 50% as shown in the figure is not necessary. According to the needs of the panel design, different numbers of clock signals will be used to bear the load required by different designs.

In the first output stage t1, the third transistor T3 is turned on in response to high potential of the first clock signal CK. At this time, the first node Q is applied with a low potential of the start signal STV, so that the first transistor T1 turns on. The second output circuit 104 outputs the second scanning signal NSCAN(n).

In the second output stage t2, the third transistor T3 is turned on in response to high potential of the first clock signal CK. At this time, the first node Q is applied and charged with the high potential of the start signal STV, and the first transistor T1 turns off. The eighth transistor T8 turns on in response to the high potential of the high-voltage reference signal transmitted from the high-voltage reference signal input terminal VGH, the high potential of the first node Q is transmitted to the second node N, so that the ninth transistor T9 and the eleventh transistor T11 are turned on, and the first output circuit 103 outputs the first scanning signal PSCAN(n).

Figure 7:
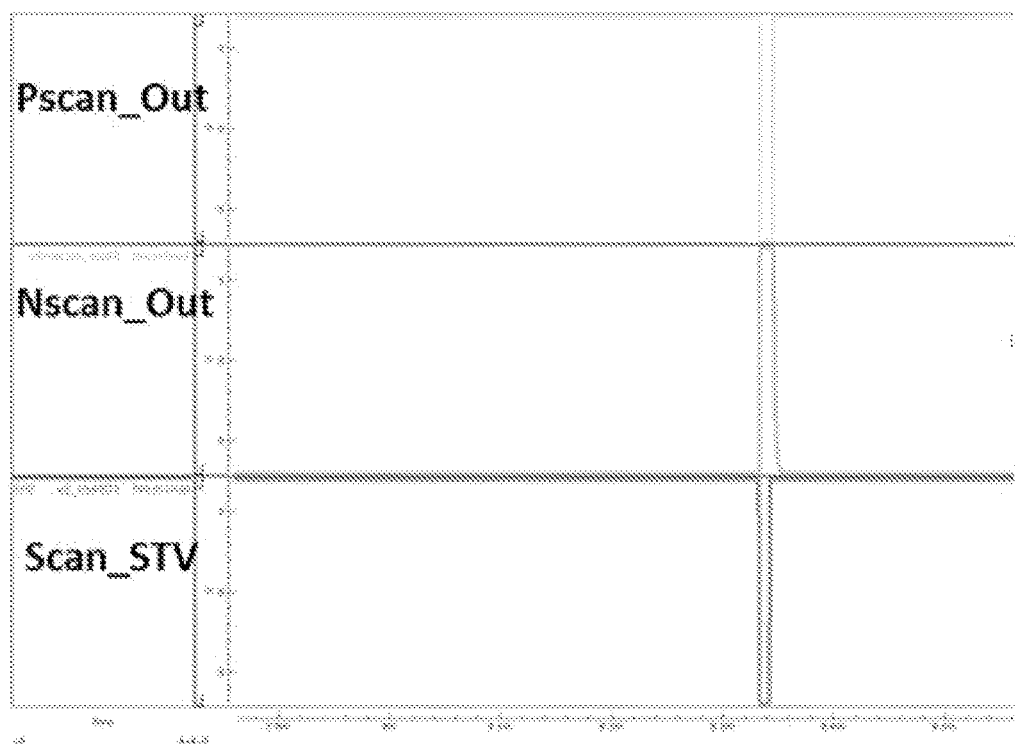
FIG. 7 depicts a simulation result of the GOA circuit illustrated in FIG. 3.

Referring to FIG. 7 depicting simulation results of the GOA circuit provided in FIG. 3, the potential changes of the first scanning signal PSCAN(n), the second scanning signal NSCAN(n), and the scanning signal PSCAN (n−1) of the previous stage GOA unit (or the start signal STV). The GOA circuit of the present disclosure realizes the forward and reverse scanning signal can be output through the one stage GOA unit, reducing the bezel space occupied by the GOA, making the display panel narrow bezel or borderless design, and can prevent the output of noise in the period of time when the scanning signal is not output, thereby ensuring the stability of driving.

Figure 8:
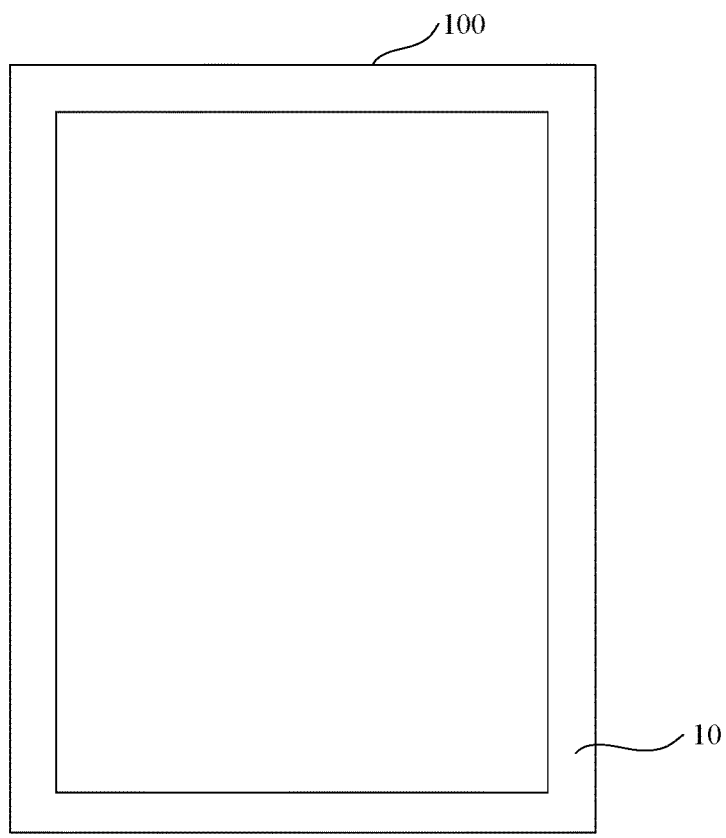
FIG. 8 is a schematic diagram a display panel according to an embodiment of the present disclosure.

Referring to FIG. 8, FIG. 8 is a schematic diagram of a display panel according to an embodiment of the present disclosure. As shown in FIG. 8, the present disclosure also provides a display panel, the display panel comprises a display area 100 and a GOA circuit 10 disposed on an edge of the display area. The GOA circuit 10 is similar to the structure and principle of the GOA circuit 10 described above, which will not be repeated here.

According to the GOA circuit and display panel provided in the embodiments of the present disclosure, the GOA circuit includes the first output circuit 103 and the second output circuit 104 to output forward and reverse scanning signals, so that the bezel space occupied by the GOA is reduced and is conducive to achieving a narrower bezel or borderless design.

The above is a GOA circuit and display panel provided by an embodiment of the present disclosure is described in detail, and a specific example is applied herein to explain the principle and embodiment of the present disclosure, and the description of the above embodiment is only used to help understand the method of the present disclosure and its core ideas. At the same time, for those skilled in the art, according to the idea of the present disclosure, there will be changes in the specific embodiment and the scope of application, in summary, the content of this specification should not be understood as a restriction on the present disclosure.

What is claimed is:

1. A Gate on array (GOA) circuit comprising a plurality of cascaded GOA units with multi-stages, each GOA unit comprising:
   a first output control circuit, coupled to a scanning signal input terminal of a previous stage GOA unit and a first node, for controlling a potential of the first node;
   a second output control circuit, coupled to the scanning signal input terminal of the previous stage GOA unit and a second node, for controlling a potential of the second node;
   a first output circuit, coupled to the first node, the second node, and a first scanning signal output terminal of a current stage GOA unit, for outputting the first scanning signal; and
   a second output circuit, coupled to the first node and a second scanning signal output terminal of the current stage GOA unit, for outputting a second scanning signal;
   wherein the first scanning signal and the second scanning signal are inverted;
   wherein the second output circuit comprises:
   a first transistor, comprising a gate coupled to the first node, a first electrode coupled to a high-voltage reference signal input terminal, and a second electrode coupled to the second scanning signal output terminal of the current stage GOA unit; and
   a second transistor, comprising a gate coupled to the first output circuit, a first electrode coupled to a low-voltage reference signal input terminal, and a second electrode coupled to the second electrode of the first transistor;
   wherein the gate of the second transistor is coupled to the first node.

2. The GOA circuit according to claim 1, wherein the first transistor is a P-type transistor, and the second transistor is an N-type transistor.

3. The GOA circuit according to claim 1, wherein the gate of the second transistor is coupled to the second node.

4. The GOA circuit according to claim 3, wherein the first transistor and the second transistor are both P-type transistors.

5. The GOA circuit according to claim 1, wherein the first output control circuit comprises a third transistor that comprises a gate coupled to a first clock signal terminal, a first electrode coupled to the scanning signal input terminal of the previous stage GOA unit, and the second electrode coupled to the first node.

6. The GOA circuit according to claim 1, wherein the second output control circuit comprises:
a fourth transistor, comprising a gate coupled to a third node, a first electrode coupled to the first clock signal terminal, and a second electrode coupled to the second node;
a fifth transistor, comprising a gate coupled to a second clock signal terminal, a first electrode coupled to the third node, and a second electrode coupled to the low-voltage reference signal input terminal;
a sixth transistor, comprising a gate coupled to the scanning signal input terminal of the previous stage GOA unit, a first electrode coupled to the low-voltage reference signal input terminal, and a second electrode coupled to the third node;
a seventh transistor, comprising a gate coupled to the first node, a first electrode coupled to the low-voltage reference signal input terminal, and a second electrode coupled to the second node; and
a first capacitor, coupled between the first clock signal terminal and the third node.

7. The GOA circuit according to claim 1, wherein the first output circuit comprises:
an eighth transistor, comprising a gate coupled to a high-voltage reference signal input terminal, a first electrode coupled to the first node, and a second electrode coupled to a fourth node;
a ninth transistor, comprising a gate coupled to the fourth node, a first electrode coupled to the high-voltage reference signal input terminal, a second electrode coupled to the first scanning signal output terminal of the current stage GOA unit and the scanning signal input terminal of the next stage GOA unit;
a tenth transistor, comprising a gate coupled to the second node, a first electrode coupled to the low-voltage reference signal input terminal, and a second electrode coupled to the first scanning signal output terminal of the current stage GOA unit;
a second capacitor, coupled between the fourth node and the output terminal of the first scanning signal; and
a third capacitor, coupled between the second node and the low-voltage reference signal input terminal.

8. The GOA circuit according to claim 7, wherein the first output circuit further comprises:
an eleventh transistor, comprising a gate coupled to the fourth node, a first electrode coupled to the second electrode of the ninth transistor, and a second electrode coupled to the first scanning signal output terminal of the current stage GOA unit.

9. The GOA circuit according to claim 2, wherein the first output control circuit comprises:
a third transistor, comprising a gate coupled to a first clock signal terminal, a first electrode coupled to the scanning signal input terminal of the previous stage GOA unit, and the second electrode coupled to the first node;
wherein the second output control circuit comprises:
a fourth transistor, comprising a gate coupled to the third node, a first electrode coupled to the first clock signal terminal, and a second electrode coupled to the second node;
a fifth transistor, comprising a gate coupled to a second clock signal terminal, a first electrode coupled to the third node, and a second electrode coupled to the low-voltage reference signal input terminal;
a sixth transistor, comprising a gate coupled to the scanning signal input terminal of the previous stage GOA unit, a first electrode coupled to the low-voltage reference signal input terminal, and a second electrode coupled to the third node;
a seventh transistor, comprising a gate coupled to the first node, a first electrode coupled to the low-voltage reference signal input terminal, and a second electrode coupled to the second node; and
a first capacitor, coupled between the first clock signal terminal and the third node;
wherein the first output circuit comprises:
an eighth transistor, comprising a gate coupled to the high-voltage reference signal input terminal, a first electrode coupled to the first node, and a second electrode coupled to a fourth node;
a ninth transistor, comprising a gate coupled to the fourth node, a first electrode coupled to the high-voltage reference signal input terminal, a second electrode coupled to the first scanning signal output terminal of the current stage GOA unit and the scanning signal input terminal of the next stage GOA unit;
a tenth transistor, comprising a gate coupled to the second node, a first electrode coupled to the low-voltage reference signal input terminal, and a second electrode coupled to the first scanning signal output terminal of the current stage GOA unit;
a second capacitor, coupled between the fourth node and the output terminal of the first scanning signal; and
a third capacitor, coupled between the second node and the low-voltage reference signal input terminal.

10. A display panel comprising a display area and a Gate on array (GOA) circuit integrated on an edge of the display area, the GOA) circuit comprising a plurality of cascaded GOA units with multi-stages, each GOA unit comprising:
a first output control circuit, coupled to a scanning signal input terminal of a previous stage GOA unit and a first node, for controlling a potential of the first node;
a second output control circuit, coupled to the scanning signal input terminal of the previous stage GOA unit and a second node, for controlling a potential of the second node;
a first output circuit, coupled to the first node, the second node, and a first scanning signal output terminal of a current stage GOA unit, for outputting the first scanning signal; and
a second output circuit, coupled to the first node and a second scanning signal output terminal of the current stage GOA unit, for outputting a second scanning signal;
wherein the first scanning signal and the second scanning signal are inverted;
wherein the second output circuit comprises:
a first transistor, comprising a gate coupled to the first node, a first electrode coupled to a high-voltage reference signal input terminal, and a second electrode coupled to the second scanning signal output terminal of the current stage GOA unit; and
a second transistor, comprising a gate coupled to the first output circuit, a first electrode coupled to a low-voltage reference signal input terminal, and a second electrode coupled to the second electrode of the first transistor;

wherein the gate of the second transistor is coupled to the first node.

11. The display panel according to claim 10, wherein the first transistor is a P-type transistor, and the second transistor is an N-type transistor.

12. The display panel according to claim 10, wherein the gate of the second transistor is coupled to the second node.

13. The display panel according to claim 12, wherein the first transistor and the second transistor are both P-type transistors.

14. The display panel according to claim 10, wherein the first output control circuit comprises a third transistor that comprises a gate coupled to a first clock signal terminal, a first electrode coupled to the scanning signal input terminal of the previous stage GOA unit, and the second electrode coupled to the first node.

15. The display panel according to claim 10, wherein the second output control circuit comprises:
 a fourth transistor, comprising a gate coupled to a third node, a first electrode coupled to the first clock signal terminal, and a second electrode coupled to the second node;
 a fifth transistor, comprising a gate coupled to a second clock signal terminal, a first electrode coupled to the third node, and a second electrode coupled to the low-voltage reference signal input terminal;
 a sixth transistor, comprising a gate coupled to the scanning signal input terminal of the previous stage GOA unit, a first electrode coupled to the low-voltage reference signal input terminal, and a second electrode coupled to the third node;
 a seventh transistor, comprising a gate coupled to the first node, a first electrode coupled to the low-voltage reference signal input terminal, and a second electrode coupled to the second node; and
 a first capacitor, coupled between the first clock signal terminal and the third node.

16. The display panel according to claim 10, wherein the first output circuit comprises:
 an eighth transistor, comprising a gate coupled to a high-voltage reference signal input terminal, a first electrode coupled to the first node, and a second electrode coupled to a fourth node;
 a ninth transistor, comprising a gate coupled to the fourth node, a first electrode coupled to the high-voltage reference signal input terminal, a second electrode coupled to the first scanning signal output terminal of the current stage GOA unit and the scanning signal input terminal of the next stage GOA unit;
 a tenth transistor, comprising a gate coupled to the second node, a first electrode coupled to the low-voltage reference signal input terminal, and a second electrode coupled to the first scanning signal output terminal of the current stage GOA unit;
 a second capacitor, coupled between the fourth node and the output terminal of the first scanning signal; and
 a third capacitor, coupled between the second node and the low-voltage reference signal input terminal.

17. A Gate on array (GOA) circuit comprising a plurality of cascaded GOA units with multi-stages, each GOA unit comprising:
 a first output control circuit, coupled to a scanning signal input terminal of a previous stage GOA unit and a first node, for controlling a potential of the first node;
 a second output control circuit, coupled to the scanning signal input terminal of the previous stage GOA unit and a second node, for controlling a potential of the second node;
 a first output circuit, coupled to the first node, the second node, and a first scanning signal output terminal of a current stage GOA unit, for outputting the first scanning signal; and
 a second output circuit, coupled to the first node and a second scanning signal output terminal of the current stage GOA unit, for outputting a second scanning signal;
 wherein the first scanning signal and the second scanning signal are inverted;
 wherein the second output control circuit comprises:
 a fourth transistor, comprising a gate coupled to a third node, a first electrode coupled to the first clock signal terminal, and a second electrode coupled to the second node;
 a fifth transistor, comprising a gate coupled to a second clock signal terminal, a first electrode coupled to the third node, and a second electrode coupled to the low-voltage reference signal input terminal;
 a sixth transistor, comprising a gate coupled to the scanning signal input terminal of the previous stage GOA unit, a first electrode coupled to the low-voltage reference signal input terminal, and a second electrode coupled to the third node;
 a seventh transistor, comprising a gate coupled to the first node, a first electrode coupled to the low-voltage reference signal input terminal, and a second electrode coupled to the second node; and
 a first capacitor, coupled between the first clock signal terminal and the third node.

* * * * *